(12) United States Patent
Anderson et al.

(10) Patent No.: US 7,922,950 B2
(45) Date of Patent: Apr. 12, 2011

(54) MONOLITHIC BUILDING ELEMENT WITH PHOTOCATALYTIC MATERIAL

(75) Inventors: Mark T. Anderson, Woodbury, MN (US); Rachael A. T. Gould, Forest Lake, MN (US); Jeffry L. Jacobs, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 1079 days.

(21) Appl. No.: 11/375,634

(22) Filed: Mar. 14, 2006

(65) Prior Publication Data

US 2007/0218314 A1   Sep. 20, 2007

(51) Int. Cl.
*E01C 7/14* (2006.01)
*B28B 1/00* (2006.01)
*B28B 3/00* (2006.01)
*E01C 7/08* (2006.01)

(52) U.S. Cl. ......... 264/256; 264/330; 264/333; 428/404

(58) Field of Classification Search ............ 264/256, 264/330, 333; 428/701, 404
See application file for complete search history.

(56) References Cited

U.S. PATENT DOCUMENTS

| | | | | | |
|---|---|---|---|---|---|
| 1,377,188 | A | * | 5/1921 | Domine | 425/218 |
| 2,007,961 | A | * | 7/1935 | Bolton | 425/130 |
| 2,018,192 | A | * | 10/1935 | Sexton | 264/71 |
| 2,097,613 | A | * | 11/1937 | Batcheller | 425/84 |
| 2,320,728 | A | * | 6/1943 | Hume | 425/449 |
| 2,401,663 | A | * | 6/1946 | Rembert | 427/198 |
| 2,422,344 | A | * | 6/1947 | Easterberg et al. | 162/122 |
| 2,446,782 | A | * | 8/1948 | Otis et al. | 264/102 |
| 4,774,045 | A | * | 9/1988 | Kushida et al. | 264/256 |
| 4,954,364 | A | * | 9/1990 | Stein et al. | 427/515 |
| 4,986,744 | A | | 1/1991 | Weisweiler et al. | |
| 5,356,664 | A | | 10/1994 | Narayan et al. | |
| 5,595,813 | A | | 1/1997 | Ogawa et al. | |
| 6,013,372 | A | | 1/2000 | Hayakawa | |
| 6,335,061 | B1 | * | 1/2002 | Kanamori et al. | 427/515 |
| 6,368,668 | B1 | * | 4/2002 | Kobayashi et al. | 427/376.2 |
| 6,409,821 | B1 | | 6/2002 | Cassar et al. | |
| 6,569,520 | B1 | | 5/2003 | Jacobs | |
| 6,881,701 | B2 | | 4/2005 | Jacobs | |
| 7,015,172 | B2 | * | 3/2006 | Inoue | 502/208 |
| 7,235,305 | B2 | * | 6/2007 | Hasskerl et al. | 428/447 |
| 7,294,365 | B2 | * | 11/2007 | Hayakawa et al. | 427/553 |
| 7,354,624 | B2 | * | 4/2008 | Millero et al. | 427/387 |

(Continued)

FOREIGN PATENT DOCUMENTS

EP   0633064   12/1998

(Continued)

*Primary Examiner* — Joseph S Del Sole
*Assistant Examiner* — Nahida Sultana
(74) *Attorney, Agent, or Firm* — Colene H. Blank; James A. Baker

(57) ABSTRACT

A building element may be formed from a first cementitious mixture and a second cementitious mixture containing a photocatalytic cementitious mixture. The first cementitious mixture and the photocatalytic cementitious mixture may be co-formed into a shaped uncured two layer monolith having a base layer of the first cementitious mixture and a top layer of the photocatalytic cementitious mixture. The shaped uncured two layer monolith is then cured. The resulting building element may be algae-resistant.

13 Claims, 1 Drawing Sheet

U.S. PATENT DOCUMENTS

| | | | |
|---|---|---|---|
| 7,354,650 B2 * | 4/2008 | Nakajima et al. | 428/446 |
| 7,361,625 B2 * | 4/2008 | Nakano et al. | 502/262 |
| 7,521,039 B2 * | 4/2009 | Bygott et al. | 423/659 |
| 7,781,062 B2 * | 8/2010 | Kitaike et al. | 428/407 |
| 2002/0016250 A1 * | 2/2002 | Hayakawa et al. | 502/5 |
| 2002/0018234 A1 | 2/2002 | Fu et al. | |
| 2002/0069791 A1 | 6/2002 | Merkley et al. | |
| 2005/0166518 A1 * | 8/2005 | Van Cauwenbergh | 52/596 |
| 2005/0266235 A1 * | 12/2005 | Nakajima et al. | 428/336 |
| 2005/0266248 A1 * | 12/2005 | Millero et al. | 428/411.1 |
| 2007/0269653 A1 * | 11/2007 | Kanamori et al. | 428/336 |
| 2008/0111267 A1 * | 5/2008 | Toncelli | 264/71 |
| 2008/0241550 A1 * | 10/2008 | Jacobs et al. | 428/412 |
| 2008/0248289 A1 * | 10/2008 | Jonschker et al. | 428/328 |

FOREIGN PATENT DOCUMENTS

| | | |
|---|---|---|
| EP | 1162182 | 12/2001 |
| EP | 0 919 667 | 7/2003 |
| JP | 200117117 A * | 4/2000 |
| KR | 101999015616 A | 3/1999 |
| WO | WO 98/05601 | 2/1998 |
| WO | WO 01/00541 | 1/2001 |
| WO | WO 2006/000565 A1 * | 1/2006 |

* cited by examiner

US 7,922,950 B2

MONOLITHIC BUILDING ELEMENT WITH PHOTOCATALYTIC MATERIAL

BACKGROUND

The present disclosure is directed to photocatalytic construction surfaces.

Discoloration of roofing substrates and other building materials due to algae infestation has become especially problematic in recent years. Discoloration has been attributed to the presence of blue-green algae, such as *Gloeocapsa* spp., transported through air-borne particles. Additionally, discoloration from other airborne contaminants, such as soot and grease, contribute to discoloration.

One approach to combat discoloration of roofs is periodic washing. This can be done with a high-power water washer. Also sometimes bleach is used in areas where micro-organism infestation is particularly bad. Having a roof professionally washed is a relatively expensive, short-term approach to algae control. The use of bleach can cause staining of ancillary structures and harm surrounding vegetation.

SUMMARY

Generally, the present disclosure relates to photocatalytic building substrates and to methods of manufacturing photocatalytic building substrates.

In one aspect of the disclosure, a method of forming a building element is disclosed. A first cementitious mixture is provided. A photocatalytic material is mixed into a second cementitious mixture to create a photocatalytic cementitious mixture. The first cementitious mixture and the photocatalytic cementitious mixture are co-formed into a shaped uncured two layer monolith having a base layer of the first cementitious mixture and a top layer of the photocatalytic cementitious mixture. The shaped uncured two layer monolith is then cured.

In another aspect of the disclosure, an algae-resistant building element is disclosed. The algae-resistant building element includes a base layer that includes a first cured cementitious mixture and an algae-resistant layer that is disposed on the base layer. The algae-resistant layer includes a photocatalytic material that is dispersed or otherwise mixed into a second cured cementitious mixture. An interface is formed between the base layer and the algae-resistant layer. The interface has a cohesive strength that is at least as high as a cohesive strength of the base layer and/or a cohesive strength of the algae-resistant layer.

These and other aspects of the present application will be apparent from the detailed description below. In no event, however, should the above summaries be construed as limitations on the claimed subject matter, which subject matter is defined solely by the attached claims, as may be amended during prosecution.

BRIEF DESCRIPTION OF THE DRAWINGS

In the several figures of the attached drawing, like parts bear like reference numerals, and.

DETAILED DESCRIPTION

Figure 1:
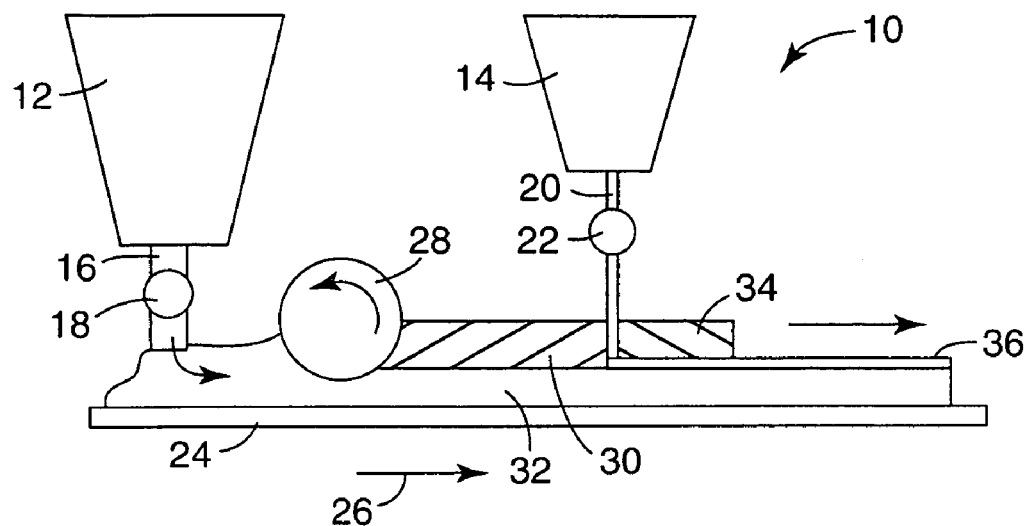
FIG. 1 is a diagrammatic side view of an apparatus useful in producing a shaped uncured monolithic building element in accordance with an embodiment of the invention.

Generally, the present disclosure relates to photocatalytic building substrates and to methods of manufacturing photocatalytic building substrates. A building substrate may be any element, layer or structure that may be useful in construction. A building substrate may be an interior substrate or an exterior substrate. A building substrate may be applied to or form part of a construction surface such as a vertical, horizontal or angled surface. Examples include floors, roofs, walls and siding of a building. Landscaping elements such as sidewalks, walkways, driveways and the like to include or be formed from building substrates.

The term "polymer" or "polymeric" will be understood to include polymers, copolymers (e.g., polymers formed using two or more different monomers), oligomers and combinations thereof, as well as polymers, oligomers, or copolymers. Both block and random copolymers are included, unless indicated otherwise.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein.

Weight percent, wt %, percent by weight, % by weight, and the like are synonyms that refer to the concentration of a substance as the weight of that substance divided by the weight of the composition and multiplied by 100.

The term "adjacent" refers to one element being in close proximity to another element and includes the elements touching one another and further includes the elements being separated by one or more layers disposed between the elements.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an" and "the" include plural referents unless the content clearly dictates otherwise. As used in this specification and the appended claims, the term "or" is generally employed in its sense including "and/or" unless the content clearly dictates otherwise.

Photocatalysts, upon activation or exposure to sunlight, establish both oxidation and reduction sites. These sites are capable of preventing or inhibiting the growth of algae on the substrate or generating reactive species that inhibit the growth of algae on the substrate. In other embodiments, the sites generate reactive species that inhibit the growth of biota on the substrate. The sites themselves, or the reactive species generated by the sites, may also photooxidize other surface contaminants such as dirt or soot or pollen. Photocatalytic elements are also capable of generating reactive species which react with organic contaminants converting them to materials which volatilize or rinse away readily.

Photocatalytic particles conventionally recognized by those skilled in the art are suitable for use with the present invention. Suitable photocatalysts include, but are not limited to, $TiO_2$, $ZnO$, $WO_3$, $SnO_2$, $CaTiO_3$, $Fe_2O_3$, $MoO_3$, $Nb_2O_5$, $Ti_xZr_{(1-x)}O_2$, $SiC$, $SrTiO_3$, $CdS$, $GaP$, $InP$, $GaAs$, $BaTiO_3$, $KNbO_3$, $Ta_2O_5$, $Bi_2O_3$, $NiO$, $Cu_2O$, $SiO_2$, $MoS_2$, $InPb$, $RuO_2$, $CeO_2$, $Ti(OH)_4$, combinations thereof, or inactive particles coated with a photocatalytic coating.

In other embodiments, the photocatalytic particles are doped with, for example, carbon, nitrogen, sulfur, fluorine, and the like. In other embodiments, the dopant may be a metallic element such as Pt, Ag, or Cu. In some embodiments, the doping material modified the bandgap of the photocatalytic particle. In some embodiments, the transition metal oxide photocatalyst is nanocrystalline anatase $TiO_2$ and nanocrystalline ZnO.

Relative photocatalytic activities of a substrate, substrate coating and/or coated substrate can be determined via a rapid chemical test that provides an indication of the rate at which hydroxyl radicals are produced by UV-illuminated photocatalyst in or on the substrate. One method to quantify the production of hydroxy radicals produced by a photocatalyst is through use of the 'terephthalate dosimeter' which has been cited numerous times in the open literature. Recent publications include: "Detection of active oxidative species in TiO2 photocatalysts using the fluorescence technique" Ishibashi, K; et. al. Electrochem. Comm. 2 (2000) 207-210. "Quantum yields of active oxidative species formed on TiO2 photocatalyst" Ishibashi, K; et al. J. Photochem. and Photobiol. A: Chemistry 134 (2000) 139-142. In particular cases, useful photocatalytic materials include $TiO_2$, $WO_3$, ZnO and similar wide-bandgap semiconducting metal oxides. In some instances, photocatalysts include the anatase form of $TiO_2$ and or mixtures of anatase $TiO_2$ and ZnO.

In some instances, a building element may be formed from a cementitious mixture. A cementitious mixture may include clay. A cementitious material may include cement. The addition of materials such as aggregate to cement provides a cementitious material known as concrete. Organic or inorganic fibers may be added to a cementitious mixture. In some cases, a cementitious mixture may include Portland cement (also known as hydraulic cement), sand and water.

These components, as well as optional additives such as pigments and the like, may be combined in any appropriate ratios, depending on the specific building element being produced. In some instances, a cementitious mixture may have a water to cement ratio of about 0.3 to 1. A cementitious mixture may, if desired, have a cement to sand ratio of about 0.2 to 1.

A building element may, if desired, be formed from a first cementitious mixture and a second cementitious mixture. The second cementitious mixture may include one or more photocatalytic materials, such as those discussed above, thereby forming a photocatalytic cementitious mixture. In some cases, the first cementitious mixture and the second cementitious mixture may be essentially the same, aside from the addition of a photocatalytic material to the second cementitious mixture. The photocatalytic cementitious mixture may include about 0.5 to about 75 volume percent photocatalytic material. The photocatalytic cementitious mixture may include about 0.5 to about 30 volume percent, or even about 10 to about 30 volume percent of the photocatalytic material.

The process of forming a building element from one or more cementitious mixtures, including a first cementitious mixture and a photocatalytic cementitious mixture formed by mixing or otherwise combining one or more photocatalytic materials and a second cementitious mixture, will be discussed hereinafter with respect to the Figures.

In some cases, a building element may include a polymeric coating or layer that may be applied to one or more surfaces of the building element in any suitable manner, such as spraying, brushing, dipping or any other suitable technique. The polymeric coating or layer may be applied either before or after curing the building element, if a curing step is involved, and may be formed of any suitable polymer. In some instances, especially if the building element contains cement, the polymeric coating may be any polymeric material useful in reducing or even preventing efflorescence. The polymeric coating may include a polyacrylate (i.e., poly(meth)acrylate). In some instances, the polymeric coating may include a polymethyl(meth)acrylate.

If a polymeric coating is applied, it may have an average thickness of about 10 to about 100 micrometers. In some instances, a polymeric coating may have an average thickness of about 20 to 50 micrometers. In some cases, it may be more useful to discuss an average thickness of the coating, as the thickness of the coating may be influenced by inconsistencies in the substrate upon which the coating is being applied. In this, an average thickness may be considered as a number average thickness.

Turning now to the Figures, FIG. 1 diagrammatically illustrates an apparatus 10 that is suitable for producing a building element in accordance with the present disclosure. Apparatus 10 includes a first hopper 12 and a second hopper 14. A first pipe 16, which may include a first pump 18, is positioned to facilitate movement of material out of first hopper 12. A second pipe 20, which may include a second pump 22, is positioned and facilitate movement of material out of second hopper 16.

Each of first hopper 12 and second hopper 14 may be filled with a cementitious mixture. In some cases, first hopper 12 may be filled with a first cementitious mixture and second hopper 16 may be filled with a second cementitious mixture. As noted above, in some cases the second cementitious mixture may be combined with a photocatalytic material to form a photocatalytic cementitious mixture. This combining step may occur either within second hopper 16 or may be performed prior to filling second hopper 14.

Apparatus 10 includes a carrier belt 24, which in the illustrated embodiment is moving in a direction indicated by arrow 26. In some instances, carrier belt 24 may simply be a flat conveyor-type surface. In other cases, carrier belt 24 may include a shaped upper surface (not illustrated) that may provide a non-flat shape to at least a bottom portion of a building element produced by apparatus 10.

To produce a monolithic two layer building element, a first cementitious mixture is provided within first hopper 12. The first cementitious mixture may be deposited onto carrier belt 24 via first pipe 16 and first pump 18. In some cases, first pump 18 may be omitted and gravity alone may provide the necessary force to move the cementitious mixture through first pipe 16. A compacting roller 28 compacts and shapes the first cementitious mixture. A first smoothing member 30 further compresses, smoothes and/or shapes the first cementitious mixture. At this point, a base layer 32 has been formed that will ultimately provide the base layer of a building element. First smoothing member 30 may be positioned relative to carrier belt 24 to provide a desired thickness to base layer 32.

A photocatalytic cementitious mixture is provided within second hopper 14. The photocatalytic mixture may be deposited onto base layer 32 via second pipe 20 and second pump 22. In some cases, second pump 22 may be omitted and gravity alone may provide the necessary force to move the photocatalytic cementitious mixture through second pipe 20. The photocatalytic cementitious mixture, once deposited into base layer 32, passes under a second smoothing member 34 that compresses, smoothes and/or shapes the photocatalytic cementitious mixture to form a photocatalytic layer 36. Second smoothing member 34 may be positioned relative to carrier belt 24 to provide a desired thickness to photocatalytic layer 36.

The two layer cementitious assembly may undergo subsequent processing steps. For example, a polymeric coating may be applied. A cutting apparatus (not shown) may be employed to cut the two layer cementitious assembly into discrete building elements. A curing step, such as subjecting the two layer cementitious assembly or pieces thereof to a kiln drying process, may be contemplated.

Figure 2:
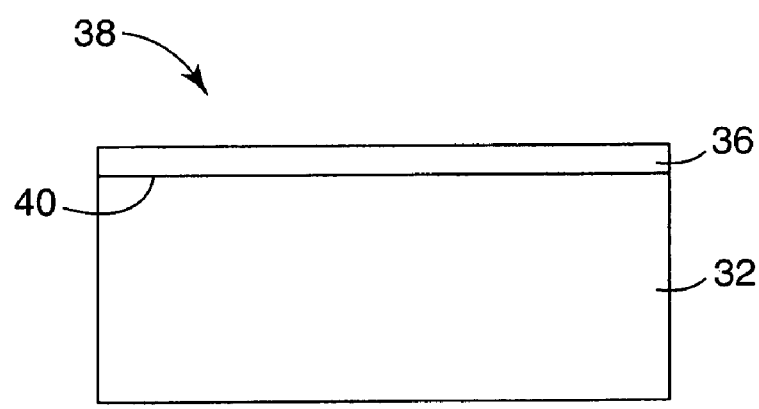
FIG. 2 is a diagrammatic side view of a building element produced by the apparatus of FIG. 1.

FIG. 2 generically shows a monolithic two-layer building element 38 formed by apparatus 10 (FIG. 1). Building element 38 includes base layer 32, photocatalytic or algae-resistant layer 36, and an interface 40 that forms between base layer 32 and photocatalytic layer 36. In some cases, interface 40 may have a cohesive strength that is at least as high as a cohesive strength of base layer 32 and/or a cohesive strength of photocatalytic layer 36. Building element 38 may be considered to be a monolithic two-layer building element due to this relationship in cohesive strength.

In referring to cohesive strength, it is to be understood that a cohesive or adhesive strength between, for example, base layer 32 and photocatalytic layer 36 is at least as high as a cohesive or adhesive strength within either of base layer 32 and/or photocatalytic layer 36. Put another way, if building element 38 were to be broken apart, it would be at least as likely to fracture within either of base layer 32 and/or photocatalytic layer 36 as it would be to fracture along interface 40. Interface 40 is at least as strong as either of base layer 32 and photocatalytic layer 36. Even though photocatalytic layer 36 may include materials absent or mostly absent from base layer 32, base layer 32 and photocatalytic layer 36 may be considered to be structurally indistinguishable from each other, and thus building element 38 functions as a monolithic building element.

As noted above, in some cases the first cementitious mixture and the second cementitious mixture to which a photocatalytic material is added may be substantially the same. In some instances, the same cementitious mixture may be uniformly dispersed through base layer 32 and photocatalytic layer 36. In some cases, base layer 32 may contain substantially no photocatalytic material.

In some cases, building element 38 may be a roofing tile, where base layer 32 forms the portion of the roofing tile that contacts the building roof surface and photocatalytic layer 36 forms the weather surface that is exposed to the elements. In some instances, building element 38 may be a siding element. If building element 38 is a siding element, base layer 32 would form the side of the siding element that contacts the building sheathing while photocatalytic layer 36 is exposed to the weather.

Building element 38 may be dimensioned as appropriate for any desired application. If, for example, building element 38 is a roofing tile or siding element, base layer 32 may have a thickness of about 2 to 3 centimeters while photocatalytic layer 36 may have a thickness of about 2 to 3 millimeters. If, however, building element 38 is something else, such as a paver block, base layer 32 may be much thicker.

Various modifications and alterations of the present invention will become apparent to those skilled in the art without departing from the spirit and scope of the invention.

What is claimed is:

1. A method of forming a roofing tile or siding element, comprising steps of:
    providing a first aqueous cementitious material;
    mixing a photocatalytic material into a second aqueous cementitious mixture to create a photocatalytic cementitious mixture;
    co-forming the roofing tile or siding element as a shaped uncured two layer monolith comprising a base layer of the first aqueous cementitious material and a top layer of the photocatalytic aqueous cementitious mixture; and
    curing the uncured two layer monolith in a kiln drying process, wherein the uncured base layer has a thickness of about 2 to about 3 centimeters and the uncured photocatalytic layer has a thickness of about 2 to 3 millimeters.

2. The method of claim 1, wherein curing the uncured two layer monolith comprises curing the base layer and the top layer simultaneously.

3. The method of claim 1, wherein curing the uncured two layer monolith provides a monolithic building element having a cured base layer, a cured photocatalytic layer and an interface therebetween.

4. The method of claim 3, wherein the interface has a cohesive strength that is at least about as high as a cohesive strength of the cured base layer and/or the cured photocatalytic layer.

5. The method of claim 1, wherein the second cementitious mixture has a composition at least substantially identical to that of the first cementitious mixture.

6. The method of claim 5, wherein the first cementitious mixture is uniformly dispersed throughout the uncured base layer and the uncured photocatalytic layer.

7. The method of claim 6, wherein the uncured base layer has substantially no photocatalytic material and the uncured photocatalytic layer includes about 10 to about 30 volume percent photocatalytic material.

8. The method of claim 1, wherein the roofing tile or siding building element comprises a roofing tile.

9. The method of claim 1, further comprising, prior to curing, a step of providing a polymer overcoat onto the uncured photocatalytic layer.

10. The method of claim 1, wherein mixing a photocatalytic material into the second cementitious mixture comprises mixing into the second cementitious mixture a material selected from the group consisting of $TiO_2$, $ZnO$, $WO_3$, $SnO_2$, $CaTiO_3$, $Fe_2O_3$, $MoO_3$, $Nb_2O_5$, $Ti_xZr_{(1-x)}O_2$, $SiC$, $SrTiO_3$, $CdS$, $GaP$, $InP$, $GaAs$, $BaTiO_3$, $KNbO_3$, $Ta_2O_5$, $Bi_2O_3$, $NiO$, $Cu_2O$, $SiO_2$, $MoS_2$, $InPb$, $RuO_2$, $CeO_2$, $Ti(OH)_4$, and combinations thereof.

11. The method of claim 1, wherein mixing a photocatalytic material into the second cementitious mixture comprises mixing into the second cementitious mixture a material selected from the group consisting of a doped photocatalytic material, a nanocrystalline photocatalytic material, and combinations thereof.

12. The method of claim 1, further comprising a step, prior to curing, of applying a polymeric topcoat to the uncured two layer monolith.

13. The method of claim 1, further comprising a kiln drying step.

* * * * *

UNITED STATES PATENT AND TRADEMARK OFFICE
CERTIFICATE OF CORRECTION

| | | |
|---|---|---|
| PATENT NO. | : 7,922,950 B2 | Page 1 of 1 |
| APPLICATION NO. | : 11/375634 | |
| DATED | : April 12, 2011 | |
| INVENTOR(S) | : Anderson et al. | |

It is certified that error appears in the above-identified patent and that said Letters Patent is hereby corrected as shown below:

<u>Column 2:</u>
Line 39, delete ""an"" and insert in place thereof --"an",--.

<u>Column 6, Claim 8:</u>
Line 31, delete "building".

Signed and Sealed this
Twelfth Day of July, 2011

David J. Kappos
*Director of the United States Patent and Trademark Office*